Oct. 12, 1965  R. L. KIDWELL  3,211,998
APPARATUS FOR MEASURING INSULATION QUALITIES OF A MATERIAL
INCLUDING PLURAL SHIELDING MEANS SURROUNDING
THE EXCITATION VOLTAGE SOURCE
Filed Aug. 6, 1962

INVENTOR.
ROBERT L. KIDWELL
BY
ATTORNEY

3,211,998
APPARATUS FOR MEASURING INSULATION QUALITIES OF A MATERIAL INCLUDING PLURAL SHIELDING MEANS SURROUNDING THE EXCITATION VOLTAGE SOURCE
Robert L. Kidwell, Colorado Springs, Colo., assignor to Western Electrodynamics, Inc., a corporation of Colorado
Filed Aug. 6, 1962, Ser. No. 215,176
6 Claims. (Cl. 324—54)

The present invention relates to apparatus for testing the insulating value of dielectric materials by measuring the leakage current which passes through the material when a given test voltage is applied thereto. The apparatus characterized by the present invention is not destructive of the test specimen, but applies only a voltage of sufficient magnitude to produce a measurable current on the order of microamperes. However, to produce even a minute current in most dielectrics a substantial voltage is required to be impressed across the insulation being tested. Voltage on the order of 2500 to 15,000 volts, when employed in a manually operated device having movable test leads and exposed terminals, presents two serious problems. First, leakage and charging currents through stray wiring capacitances become so pronounced as to produce large errors in the test results if not properly dealt with. Secondly, the safety of the operator of the device is jeopardized.

Efforts have been made to solve these problems in generically similar devices of the prior art, however, the solutions to date have fallen short of providing a device of this general type which eliminates from the measuring device all of the unwanted stray currents and has good regulation while at the same time providing complete safety for the operator.

To supply these needs of the prior art are among the objects of the present invention.

More specifically, it is the object of the invention to provide a portable insulation tester of simplified design and construction which will eliminate from the metering circuitry therein all traces of stray capacitive currents and external disruptive effects.

It is a further object of the invention to provide a fail-safe, highly sensitive circuit-opening device which will not adversely affect the voltage regulation of the circuit, but will protect the operator from electrical shock should he accidentally become a conductive path in the high voltage circuitry.

A still further object of the invention is to provide an insulation measuring device which will, with equal ease and efficiency, apply A.C. or D.C. voltage to the test specimen.

Other and still further objects, features, and advantages of the present invention will become apparent as the description of the invention proceeds.

The invention is fundamentally characterized by a voltage step-up transformer having a tapped secondary comprising a high tension winding and lead therefrom which are both guarded and shielded and which are, in effect, connected in series with the specimen to be tested, a current measuring means, and a sensitive relay. The high voltage guard shield is connected to the tap on the transformer secondary and the remaining secondary terminal is grounded through a neutralizing "trimmer" capacitor. The basic circuit is completed by grounding the low voltage side of the test specimen.

The exact nature of the invention, and the preferred form in which it is practiced will be described in detail in the following specification taken in conjunction with the drawing in which.

Figure 1:
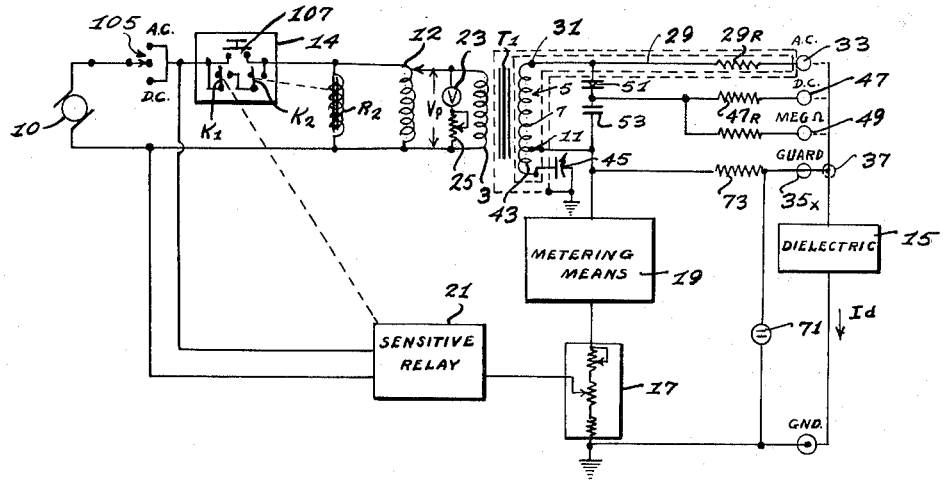
FIGURE 1 is a simplified block diagram of the essential elements of the invention.
Figure 2:
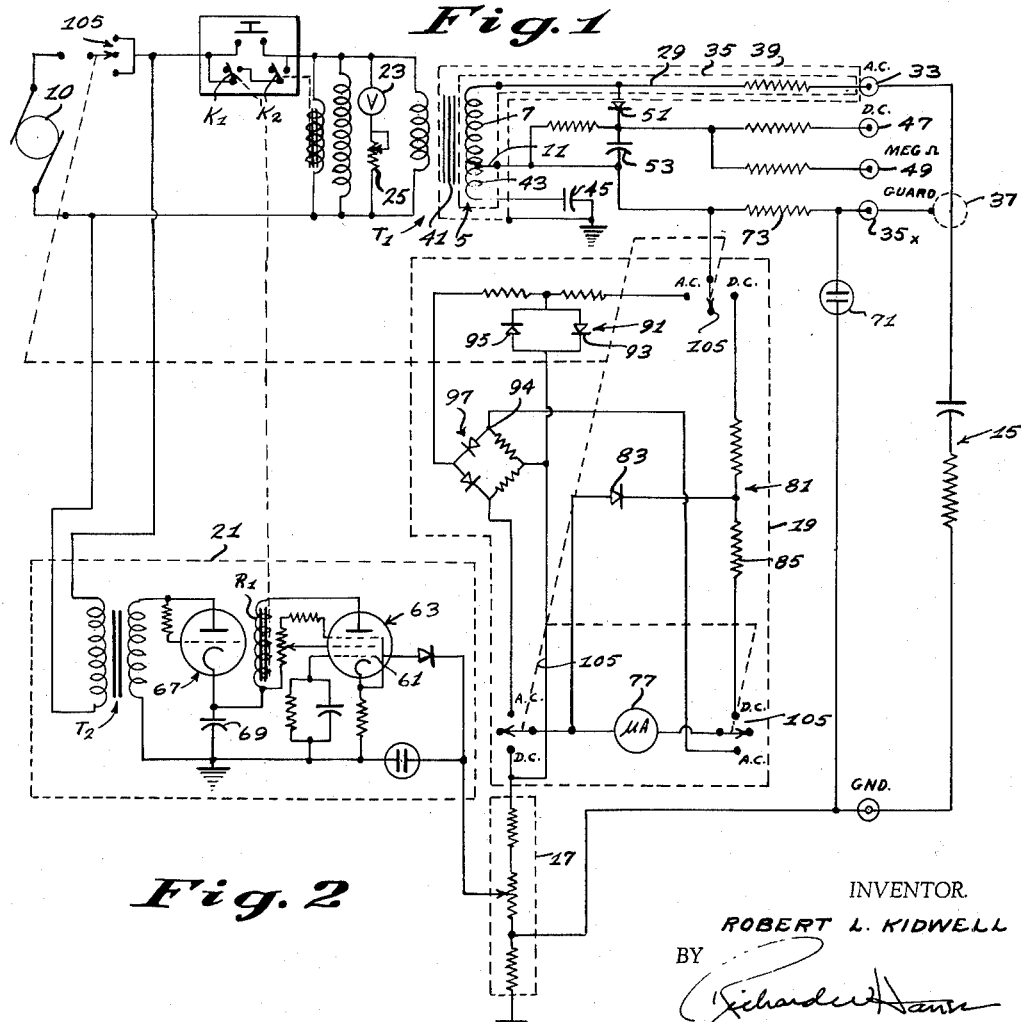
FIGURE 2 is a schematic diagram of the basic circuit of the preferred embodiment of the invention.

Referring now to the drawing for a more detailed description of the invention, the circuit of the insulation tester is seen to include a voltage step-up transformer $T_1$ having a primary winding 3 and a tapped secondary winding 5. For the illustrated embodiment a ten to one tapping ratio is chosen so as to provide 2,500 volts output from one portion 7 of the high tension secondary and 250 volts output between a tap 11 and the lower end terminal of the secondary winding. Naturally the stated magnitude of the chosen voltage and the tapping point on the transformer secondary are exemplary only and can be altered to suit specific needs without departing from the scope of this invention.

In operation, the high voltage winding 7 is connected across a series combination of the dielectric 15 which is under test, a relay triggering voltage divider network 17 and the current metering means 19.

The primary winding 3 of the transformer $T_1$ is connected to an appropriate source 10 of alternating current power through an adjustable auto-transformer 12 which provides adjustment for the magnitude of the primary voltage $V_p$, and a series-parallel arrangement 14 of normally open switch and relay contacts which comprise the automatic circuit disruption for the transformer $T_1$ voltage, whenever excessive current flows in the secondary circuit of the transformer. The normally open relay contacts $K_1$ and $K_2$ are operated by relay coils $R_1$ and $R_2$, the former being a fundamental element of the sensitive relay circuit 21, as will be explained subsequently, and the latter being connected in parallel with the auto-transformer 12 and across the source 10 of alternating current power when the switching arrangement 14 is made to present a continuous current path between its terminals. A voltmeter 23 and a series calibrating resistor 25 are connected directly across the primary winding 3 of the transformer $T_1$ to measure the voltage thereacross, however, the voltmeter 23 is calibrated to directly indicate the voltage output of the high tension winding 7 in the transformer secondary 5.

During ordinary use of the high voltage transformer $T_1$ and the lead 29 between the high voltage terminal 31 and the A.C. output terminal 33, charging currents exist between the transformer secondary and ground and between the high voltage conductor 29 and ground. The return path of these charging currents to the low voltage end of the transformer necessarily goes through the metering means 19 inserting an erroneous addition to the dielectric current $I_d$ already present. To avoid such unwanted error a guarding shield 35 is provided to surround the entire transformer secondary 5 and the high voltage conductor 29 isolating these elements from the remainder of the circuitry and ground. Methods of shielding are well known in the art and therefore a detailed explanation will not be provided. The guard shield 35 is electrically connected to the secondary tap 11, thus providing a return path for the shield-to-high voltage capacitive currents, while at the same time keeping these currents confined to their prescribed paths and out of the metering circuit 19. The external high voltage circuit is similarly protected and guarded by interconnecting the test lead shield 37 to the external guard circuit terminal 35X.

A grounded shielding 39 surrounds the guard shield 20 and also the iron core 41 of the transformer $T_1$ to eliminate the adverse effects of external electro-static disturbances either from parts of the apparatus itself or from other proximate high voltage sources. The grounded shield 39 also acts to give a constant capacitance to ground in parallel with the metering means which improves the accuracy of measurement under varying temperature conditions which might affect the insulation between the guard 35 and the grounded shield 39.

Although highly important and effective, the guard shield 35 is not totally successful in eliminating all unwanted charging currents. However, as related in the forepart of his specification, one purpose of the invention is to eliminate all traces of stray currents which would adversely affect the indication of the metering means. Consequently, one novel feature of the invention is found in the neutralizing portion 43 of the transformer secondary 5 and the associated neutralizing capacitor 45 which completes the current path from the end terminal of the neutralizing winding to ground. The voltage output of the neutralizing winding 43 is opposite in phase to that of the high voltage winding 7 and therefore the capacitive current flowing from ground through the neutralizing capacitor 45 will be opposite in phase to the capacitive charging current flowing between the high voltage points of the transformer output circuit and ground. By adjustment of the neutralizing capacitor 45 its capacitance can be made to exceed the charging or leakage capacitance by a factor equal to the tapping ratio of the transformer secondary, thus equalizing the magnitude of the oppositely phased currents and causing them to cancel each other.

In addition to the A.C. output terminal 33, the circuit is also provided with a D.C. output terminal 47, and a megohm terminal 49. A rectifier 51 and series filter capacitor 53 in parallel with the high voltage portion 7 of the transformer secondary give a D.C. output for use when such a test is indicated. Both the A.C. and D.C. test conductors incorporate series current limiting resistors 29R and 47R respectively which may be of the order of 250,000 ohms. Prior art devices which have not enjoyed the advantages of the sensitive relay circuitry employed in the present invention have necessarily used large current limiting resistors on the order of megohms in like locations to afford some measure of protection to operating personnel. It is apparent though that large resistors have the definite disadvantage of producing proportionately large voltage drops and poor voltage regulation. In the present circuit low value current limiting resistors are made possible because of the sensitive relay circuit 21 and its triggering voltge divider 17, which divider is in series with a portion 7 of the transformer secondary 5, the dielectric 15, and the metering means 19. The low end of the triggering voltage divider 17 is held at ground potential and therefore all current flowing from ground to the transformer secondary 5 must pass through the divider resistors, thus producing a biasing voltage on the control grid 61 of the sensitive relay pentode amplifier tube 63. Current through the divider 17 in excess of some chosen limiting value which would not be injurious to operating personnel biases the pentode 63 to a plate current magnitude insufficient to keep the plate relay $R_1$ energized. When the sensitive relay $R_1$ is de-energized the contact $K_1$ of the relay, which is in the primary circuit of the transformer $T_1$, opens and removes the voltage from the transformer. In addition to the plate relay $R_1$, the sensitive relay circuit contains a step-up transformer $T_2$, across the secondary of which is a diode connected vacuum tube 67 which, with its cathode filter capacitor 69, provides a direct current plate voltage source for the amplifier pentode 63. The functioning of the biasing elements for the pentode 63 are all within the skill of the art and further reference will not be made to them.

It has been shown how the trigger voltage divider 17 will cause the sensitive relay circuit 21 to de-energize the high voltage circuit if a careless operator were to establish a current path between a high voltage point and ground, but a possibility of a rather large shocking voltage also exists between the A.C. or D.C. potentials and the guard potential, neither of which are grounded. A current path between these points would avoid the path through the voltage divider 17 and the high voltage circuit would not be de-energized. To eliminate this possibility, a neon tube 71 is connected between the guard terminal 35X and ground. A resistor 73 is connected in series with the guard conductor and is of such value as to produce a firing voltage for the neon tube 71 when a chosen limiting value of current flows therethrough. After the tube 71 fires the guard circuit acquires ground potential and current will flow through the trigger voltage divider 17 accomplishing the de-energization of the high voltage circuit to protect personnel.

The preferred method of measuring the leakage current through the dielectric 15 is with a direct current micro-ammeter 77 which is connected in series with the triggering voltage divider 17 and the guard circuit 35 of the transformer T. Although the sensitive relay circuit 21 protects the operator from excessive currents and will de-energize the high voltage during overloads it is probable that the very sensitive micro-ammeter would be damaged by excessive current before the relay circuit had time to operate. Therefore, a system of meter protection is included as part of the inventive combination. Two protective systems are provided, one for A.C. and one for D.C. operation. Each system comprises a voltage divider 81 in series with the meter movement 77 and a zener diode 83 connected across the meter and one of the resistors 85 of the voltage divider 81. The voltage divider resistance values are chosen so that current flow exceeding full scale of the meter will produce the diode zener voltage, causing the diode to break down and conduct the excess current around the meter. The A.C. protective circuit 91 is the same as the D.C. except that two zener diodes 93 and 95 are employed in a parallel back-to-back arrangement for both half cycles of the A.C. current.

For the A.C. operation of the device a diode half bridge rectifier 97 of well known configuration is actually the element in series between the guard 35 and the triggering voltage divider 17. The D.C. micro-ammeter 77 is connected across the diagonals 99 and 101 of the bridge 97.

Operation of the insulation tester is initiated by placing the ganged mode switch 105 in either the A.C. or D.C. position, depending on the test to be made. As seen in the accompanying diagram, this movement of the mode switch applies voltage to the plate voltage transformer $T_2$ and unless excessive bias is present on the control grid 61 of the amplifier pentode 63, the relay $R_1$ will be energized by the flow of plate current in the pentode. When the sensitive relay $R_1$ energizes, its contact $K_1$ in the primary circuit of the high voltage transformer $T_1$ closes. The circuit to the primary is completed by momentarily closing the manual switch 107 which bridges the relay contacts. Since the primary winding and the coil of the holding relay $R_2$ are in parallel, the holding relay $R_2$ is also energized by the closing of the manual switch and the relay's self-holding contact $K_2$ closes, completing the parallel circuit to the transformer primary around the manual switch 107. As previously indicated, any excess current flow in the triggering voltage divider will cause the sensitive relay circuit to open the relay contact $K_1$ and thus de-energize the high voltage system.

Having thus described the several useful and novel features of the insulation tester of the present invention in connection with the accompanying diagrams, it will be seen that the many worthwhile objectives for which it was designed have been achieved. Although but one of the several possible embodiments of the invention has been illustrated and described herein, I realize that certain additional modifications may well occur to those skilled in the art within the broad teaching hereof; hence, it is my intention that the scope of protection afforded hereby shall be limited only insofar as said limitations are expressly set forth in the appended claims.

I claim:

1. Apparatus for testing insulation by measuring leakage current through the dielectric material across which a voltage is applied, comprising in combination;

a voltage step-up transformer having a primary winding and a tapped secondary winding;

means including series connected switching contacts for connecting the primary winding to a source of alternating current voltage;

a high voltage conductor connected to one end of the said transformer secondary;

a shielding guard surrounding the secondary winding of the transformer and the high voltage conductor, said guard being electrically connected to the said tapping point on the transformer secondary;

a second shield surrounding said shielding guard and connected to a point of ground potential;

a neutralizing capacitor connected between a point of ground potential and the other end of said transformer secondary winding;

electric current metering means;

a voltage divider network having means for providing a voltage output, said network and current metering means serially electrically connected between a point of ground potential and the said shielding guard;

means responsive to the voltage output of said voltage divider network for operating the switching contacts in the circuit of the primary winding of the transformer; and means attached to the high voltage conductor and a point of ground potential for connecting in series between these said points the dielectric to be tested.

2. The combination of claim 1, and further including;

rectifier means comprising a rectifier element and a filter capacitor serially connected across the portion of the secondary winding of the transformer between the tapping point and the high voltage conductor;

terminal means; and a conductor interconnecting the terminal means and a point between the rectifier element and the filter capacitor.

3. The combination of claim 1, and further including;

a terminal electrically connected to the shielding guard;

a gas filled tube having anode and cathode forming members which are connected between a point of ground potential and the shielding guard terminal; and means in series with the said connection between the shielding guard and the terminal which is responsive to produce a voltage thereacross upon the flow of electrical current therethrough.

4. An apparatus for the measurement of electrical qualities of insulation between two conductive points of connection, comprising in combination;

a source of alternating current high voltage having excitation means and at least first and second output terminals;

a conductor leading from the first output terminal to one of the said points of connection;

an inner shielding means enveloping the said source of high voltage and the said conductor and electrically connected to the second of said terminals;

an outer system of shields surrounding the high voltage source and the said conductor and electrically connected to a point of ground potential;

a continuous electrical path interconnecting the other of said points of connection and the inner system of shields, said path comprising current measuring means; and means responsive to the current flow in the path for disabling the source of high voltage and electrically connected to the excitation means;

a second source of alternating current voltage having first and second output terminals, said first terminal electrically common with the second terminal of the high voltage source, and said second source of voltage adapted to produce a voltage at its said second terminal which is opposite in phase to the output of the first terminal of the high voltage source; and capacitive means connected between a point of ground potential and the second terminal of the said second source of alternating current voltage.

5. An apparatus for the measurement of electrical qualities of insulation between two conductive points of connection, comprising in combination;

a source of alternating current high voltage having excitation means and at least first and second output terminals;

a conductor leading from the first output terminal to one of the said points of connection;

an inner shielding means enveloping the said source of high voltage and the said conductor and electrically connected to the second of said terminals;

an outer system of shields surrounding the high voltage source and the said conductor and electrically connected to a point of ground potential;

a continuous electrical path interconnecting the other of said points of connection and the inner system of shields, said path comprising, current measuring means;

a second source of alternating current voltage having first and second output terminals, said first terminal electrically common with the second terminal of the high voltage source, and said second source of voltage adapted to produce a voltage at its said second terminal which is opposite in phase to the output of the first terminal of the high voltage source; and capacitive means connected between a point of ground potential and the second terminal of the said second source of alternating current voltage.

6. The apparatus of claim 4 wherein the means responsive to the current flow in the said continuous path comprises;

a voltage producing network having an output and responsive to the current flow in the said path;

amplifier means having an output and an input which is connected to the output of the voltage producing network; and electromagnetic means having an armature mechanically linked to the said switching means, said electromagnetic means connected to the output of the amplifier means.

References Cited by the Examiner

UNITED STATES PATENTS

| | | | |
|---|---|---|---|
| 1,945,263 | 1/34 | Doble | 324—54 |
| 2,170,813 | 8/39 | Doble et al. | 324—54 |
| 2,329,098 | 9/43 | Browning et al. | 324—54 |
| 2,920,270 | 1/60 | Saw | 324—54 |
| 2,932,791 | 4/60 | Carrington | 324—54 X |
| 2,941,143 | 6/60 | Liao et al. | 324—54 |

FOREIGN PATENTS 1,029,078  4/58  Germany.

FREDERICK M. STRADER, *Primary Examiner.*